(12) United States Patent
Weiss et al.

(10) Patent No.: US 8,306,903 B2
(45) Date of Patent: Nov. 6, 2012

(54) COMMISSION CALCULATOR AND DISPLAY

(75) Inventors: Joel Weiss, Monsey, NY (US); Timothy H. Heaton, Morristown, NJ (US)

(73) Assignee: BGC Partners, Inc., New York, NY (US)

( * ) Notice: Subject to any disclaimer, the term of this patent is extended or adjusted under 35 U.S.C. 154(b) by 26 days.

(21) Appl. No.: 12/766,370

(22) Filed: Apr. 23, 2010

(65) Prior Publication Data

US 2011/0264589 A1  Oct. 27, 2011

(51) Int. Cl.
*G06Q 40/00* (2006.01)
(52) U.S. Cl. ....... 705/37; 705/36 R; 705/26.3; 705/7.15; 705/27.1
(58) Field of Classification Search .............. 705/7.15, 705/27.1, 36 R–37, 26.3
See application file for complete search history.

(56) References Cited

U.S. PATENT DOCUMENTS

| | | | |
|---|---|---|---|
| 4,980,826 A * | 12/1990 | Wagner | ............................ 705/37 |
| 5,136,501 A | 8/1992 | Silverman et al. | |
| 5,414,624 A | 5/1995 | Anthonyson | |
| 5,842,178 A | 11/1998 | Giovannoli | |
| 5,905,974 A | 5/1999 | Fraser et al. | |
| 5,918,218 A | 6/1999 | Harris et al. | |
| 5,924,083 A | 7/1999 | Silverman et al. | |
| 6,029,146 A | 2/2000 | Hawkins et al. | |
| 6,317,727 B1 | 11/2001 | May | |
| 6,408,282 B1 | 6/2002 | Buist | |
| 6,421,653 B1 | 7/2002 | May | |
| 6,505,174 B1 | 1/2003 | Keiser et al. | |
| 6,560,580 B1 | 5/2003 | Fraser et al. | |
| 6,618,707 B1 | 9/2003 | Gary | |
| 6,662,164 B1 | 12/2003 | Koppelman et al. | |
| 6,850,907 B2 | 2/2005 | Lutnick et al. | |
| 6,963,856 B2 | 11/2005 | Lutnick et al. | |
| 6,985,883 B1 | 1/2006 | Togher et al. | |
| 7,003,488 B2 | 2/2006 | Dunne et al. | |
| 7,006,991 B2 | 2/2006 | Keiser et al. | |
| 7,024,386 B1 | 4/2006 | Mills et al. | |
| 7,110,972 B1 | 9/2006 | Handa et al. | |
| 7,165,048 B2 | 1/2007 | Heppenstall, Jr. | |
| 7,222,089 B2 | 5/2007 | Harpale | |
| 7,246,092 B1 | 7/2007 | Peterson et al. | |
| 7,249,080 B1 | 7/2007 | Hoffman et al. | |
| 7,251,620 B2 | 7/2007 | Walker et al. | |

(Continued)

FOREIGN PATENT DOCUMENTS

JP    2000-148850    5/2000

(Continued)

OTHER PUBLICATIONS

USPTO Office Action for U.S. Appl. No. 11/213,601, Apr. 14, 2008 (6 pages).

(Continued)

*Primary Examiner* — Harish T. Dass
(74) *Attorney, Agent, or Firm* — David E. Boundy

(57) ABSTRACT

Commission allocations in transaction management of auction-based trading for specialized items such as fixed income instruments. A plurality of workstations that are connected to a server, and a structured commission allocation protocol may be provided. Through the workstations, the server and the commission allocation protocol, the systems and methods may allocate commissions or fees when trading securities at accelerated levels with minimal errors and costs, control commission elements during real-time trading, reward customers and brokers who participate in transactions, and distribute commission and transaction data in real time.

31 Claims, 9 Drawing Sheets

U.S. PATENT DOCUMENTS

| | | | |
|---|---|---|---|
| 7,366,690 B1 | 4/2008 | Howorka et al. | |
| 7,386,497 B1 | 6/2008 | Gooch | |
| 7,392,214 B1 | 6/2008 | Fraser et al. | |
| 7,398,244 B1 | 7/2008 | Keith | |
| 7,472,087 B2 | 12/2008 | Keith | |
| 7,685,052 B2 | 3/2010 | Waelbroeck et al. | |
| 7,707,097 B1 | 4/2010 | Weiss | |
| 7,720,742 B1 | 5/2010 | Mauro et al. | |
| 2001/0042040 A1 | 11/2001 | Keith | |
| 2002/0004776 A1 | 1/2002 | Gladstone | |
| 2002/0010672 A1 | 1/2002 | Waelbroeck et al. | |
| 2002/0029180 A1 | 3/2002 | Kirwin et al. | |
| 2002/0032635 A1 | 3/2002 | Harris et al. | |
| 2002/0055901 A1 | 5/2002 | Gianakouros et al. | |
| 2002/0099641 A1 | 7/2002 | Mills et al. | |
| 2002/0156716 A1 | 10/2002 | Adatia | |
| 2002/0161624 A1 | 10/2002 | Bradlee | |
| 2002/0161690 A1 | 10/2002 | McCarthy et al. | |
| 2002/0169703 A1* | 11/2002 | Lutnick et al. | 705/37 |
| 2003/0018557 A1 | 1/2003 | Gilbert et al. | |
| 2003/0028461 A1 | 2/2003 | Kohorn | |
| 2003/0028496 A1 | 2/2003 | Yearworth et al. | |
| 2003/0033240 A1 | 2/2003 | Balson et al. | |
| 2003/0096651 A1 | 5/2003 | Black | |
| 2003/0139997 A1 | 7/2003 | Ginsberg | |
| 2003/0149636 A1 | 8/2003 | Lutnick et al. | |
| 2003/0154100 A1 | 8/2003 | Sato et al. | |
| 2003/0200167 A1 | 10/2003 | Kemp, II et al. | |
| 2003/0220867 A1 | 11/2003 | Goodwin et al. | |
| 2003/0229571 A1 | 12/2003 | May | |
| 2003/0233307 A1* | 12/2003 | Salvadori et al. | 705/37 |
| 2003/0233309 A1 | 12/2003 | Matus et al. | |
| 2004/0034591 A1 | 2/2004 | Waelbroeck et al. | |
| 2004/0059666 A1 | 3/2004 | Waelbroeck et al. | |
| 2004/0073506 A1 | 4/2004 | Tull, Jr. et al. | |
| 2004/0088242 A1 | 5/2004 | Ascher et al. | |
| 2004/0122761 A1 | 6/2004 | Thierer et al. | |
| 2004/0138904 A1 | 7/2004 | La Loggia | |
| 2004/0153392 A1 | 8/2004 | West et al. | |
| 2004/0162772 A1 | 8/2004 | Lewis | |
| 2004/0210511 A1 | 10/2004 | Waelbroeck et al. | |
| 2004/0236669 A1 | 11/2004 | Horst et al. | |
| 2004/0254804 A1 | 12/2004 | Peterffy et al. | |
| 2004/0254877 A1 | 12/2004 | Buckwlater et al. | |
| 2004/0260640 A1 | 12/2004 | Crostwaite et al. | |
| 2005/0096931 A1 | 5/2005 | Baker et al. | |
| 2005/0102219 A1 | 5/2005 | Taylor et al. | |
| 2005/0102220 A1 | 5/2005 | Stackpole | |
| 2005/0108143 A1 | 5/2005 | Beadle et al. | |
| 2005/0144109 A1 | 6/2005 | Boni et al. | |
| 2005/0149428 A1 | 7/2005 | Gooch et al. | |
| 2005/0160032 A1 | 7/2005 | Lutnick et al. | |
| 2005/0228739 A1 | 10/2005 | Leibowitz | |
| 2006/0041498 A1 | 2/2006 | Hausman et al. | |
| 2006/0080216 A1 | 4/2006 | Hausman et al. | |
| 2006/0080220 A1 | 4/2006 | Samuel et al. | |
| 2006/0080222 A1 | 4/2006 | Lutnick et al. | |
| 2006/0095327 A1 | 5/2006 | Vaughn et al. | |
| 2006/0112002 A1 | 5/2006 | Holland et al. | |
| 2006/0190386 A1 | 8/2006 | Levy | |
| 2006/0242056 A1 | 10/2006 | Walker et al. | |
| 2006/0247997 A1 | 11/2006 | West et al. | |
| 2007/0005487 A1 | 1/2007 | Keith | |
| 2007/0233595 A1 | 10/2007 | Nordlicht et al. | |
| 2007/0276748 A1 | 11/2007 | Shapiro et al. | |
| 2008/0040254 A1 | 2/2008 | Waelbroeck et al. | |
| 2008/0040255 A1 | 2/2008 | Shapiro et al. | |

FOREIGN PATENT DOCUMENTS

| | | |
|---|---|---|
| JP | 2001-249962 | 9/2001 |
| JP | 2001-525963 | 12/2001 |
| JP | 2003-58733 | 2/2003 |
| WO | WO/ 01/50776 | 7/2001 |
| WO | WO 2004/042514 | 5/2004 |
| WO | WO 2005/004015 | 1/2005 |
| WO | WO 2005/045613 | 5/2005 |

OTHER PUBLICATIONS

USPTO Office Action for U.S. Appl. No. 11/213,601, Aug. 26, 2008 (13 pages).
U.S. Appl. No. 12/115,313, filed May 5, 2008, Lutnick et al.
U.S. Appl. No. 11/213,601, filed Aug. 26, 2005, Lutnick et al.
USPTO Office Action for U.S. Appl. No. 10/023,241; 10 pages; Jul. 7, 2008.
USPTO Office Action for U.S. Appl. No. 10/023,241; 10 pages; Oct. 15, 2007.
USPTO Office Action for U.S. Appl. No. 10/023,241; 20 pages; Dec. 18, 2006.
USPTO Office Action for U.S. Appl. No. 10/023,241; 12 pages; Jun. 5, 2007.
U.S. Appl. No. 10/023,241, filed Dec. 17, 2001, Ginsberg.
USPTO Office Action for U.S. Appl. No. 10/345,466; 9 pages; Sep. 21, 2007.
USPTO Office Action for U.S. Appl. No. 10/345,466; 8 pages; Jun. 3, 2008.
Smart Computing "Buy & Sell Stock Online"; Recreation Jul. 2000, vol. 6 Issue 7; pp. 116-121 in print issue.
Broker.com, Graduate School of Business Stanford University. Case EC-13, Apr. 26, 2000.
International Search report for International Patent Application No. PCT/US02/39235; 1 page Mar. 7, 2003.
U.S. PTO Office Action for U.S. Appl. No. 11/213,601; 15 pages; 6/18/9.
USPTO Office Action for U.S. Appl. No. 10/023,241; 13 pages; Apr. 9, 2009.
USPTO Office Action for U.S. Appl. No. 10/345,466; 13 pages; Feb. 26, 2009.
Attachment "Forex Software Solutions"—PDF Format.
U.S. PTO Office Action for U.S. Appl. No. 12/115,313; 6 pages; 8/6/9.
Notice of Allowance for U.S. Appl. No. 10/345,466; Dec. 22, 2009; 11 pages.
U.S. PTO Office Action for U.S. Appl. No. 12/115,313; 9 pages; Jan. 4, 2011.
U.S. PTO Office Action for U.S. Appl. No. 12/115,313; 8 pages; Jan. 18, 2011.
Liu, Chen-Ching, Decision Support Tools for trading in deregulated energy Systems, Advanced Power Technologies (APT) Center, University of Washington, IEEE, pp. 409-410, 2001.
Moldovan, et. al. Trading in the Market: An experiment in Group Decision Dynamics, IEEE, 6 pages.
Schoreels, et. al., Agent Based Genetic Algorithm Employing Financial Technical Analysis for Making Trading Decisions Using Historical Equity Market Data, IEEE, pp. 421-424, 2004.
Journal of Beijing University of Technology, The British Library—"The Worlds Knowledge", vol. 30, No. 2, 5 pages, Jun. 2004.
Patent Pending Application entitled System and Method for Routing Trading Orders in an Electronic Trading System Using Trader Lists, by Mathew W. Claus, et. al.; 48 pages; filed Jul. 27, 2006.
Patent Pending Application entitled System and Method for Using Trading Lists in an Electronic Trading System to Route a Trading Order with a Reserved Size, by Mathew W. Claus, et. al.; 44 pages; filed Jul. 27, 2006.
Notification of Transmittal of the international Search report and the Written Opinion of the International Searching Authority for international Application No. PCT/US06/29472; 7 pages; Jul. 31, 2007.
Notification of Transmittal of the international Search report and the Written Opinion of the International Searching Authority for international Application No. PCT/US06/29679; 9 pages; Aug. 20, 2007.
U.S. PTO Office Action for U.S. Appl. No. 11/495,254; 11 pages; Aug. 19, 2008.
Merriam Webster Online Dictionary; Definition for Associate; 2 pages.
U.S. PTO Office Action for U.S. Appl. No. 11/495,236; 27 pages; Oct. 2, 2008.
U.S. PTO Office Action for U.S. Appl. No. 11/495,235; 13 pages; Sep. 3, 2008.
Patent Pending Application entitled System and Method for Limiting Aggressive Trading in an Electronic Trading System, by Mathew W. Claus, et. al.; 34 pages; filed Jul. 27, 2006.

U.S. PTO Office Action for U.S. Appl. No. 11/495,254; 7 pages; Mar. 17, 2009.
U.S. PTO Office Action for U.S. Appl. No. 11/495,235; 13 pages; May 12, 2009.
U.S. PTO Office Action for U.S. Appl. No. 11/495,236; 40 pages; Jun. 18, 2009.
Notice of Allowance for U.S. Appl. No. 11/495,254; May 27, 2010; 22 pages.
Notice of Allowance for U.S. Appl. No. 11/495,236; Jul. 22, 2010; 7 pages.
AU Examiner Report for Application No. 2006275623 dated Jul. 15, 2009; 2 pages.
AU Examiner Report for Application No. 2006272512 dated Jul. 14, 2009; 3 pages.
AU Examiner Report for Application No. 2006275622 dated Jul. 8, 2009; 2 pages.
Response to Office Action for U.S. Appl. No. 11/213,601 dated Feb. 26, 2009; 12 pages.
Response to Office Action for U.S. Appl. No. 11/213,601 dated Dec. 18, 2009; 5 pages.
Response to Office Action for U.S. Appl. No. 11/213,601 dated Sep. 3, 2010; 14 pages.
Supplemental Response for U.S. Appl. No. 11/213,601 dated Nov. 12, 2010; 14 pages.
Response to Office Action for U.S. Appl. No. 11/213,601 dated Jun. 20, 2010; 15 pages.
Response to Office Action for U.S. Appl. No. 11/495,254 dated Feb. 19, 2009; 17 pages.
Response to Office Action for U.S. Appl. No. 11/495,254 dated Mar. 1, 2010; 18 pages.
Notice of Acceptance for Application No. 2006275623 dated Apr. 14, 2011; 3 pages.
Notice of Acceptance for Application No. 2006272512 dated Apr. 13, 2011; 3 pages.
Notice of Acceptance for Application No. 2006275622 dated Apr. 6, 2011; 3 pages.
U.S. Office Action for U.S. Appl. No. 12/888,796 dated Apr. 8, 2011; 28 pages.
USPTO Office Action for U.S. Appl. No. 11/213,601 dated Jan. 18, 2011; 13 pages.
USPTO Office Action for U.S. Appl. No. 10/023,241; 14 pages; Nov. 26, 2010.
BT "Online firms Beginning to provide retail investors with option to direct orders"; Securities Week; Jan. 18, 1999 (Section: Special Section; Securities Industry Internet Update; vol. 26, No. 3; p. 5).
Lucas-Daxim L. Lucas "Trading from wherever, whenever (online Stock Investments)"; Buisnessworld; Aug. 20, 2011, Monday.
Pat Cifaldi "With Globex, Brokers could be trading in a market that never Sleeps"; The Business Journal—Milwaukee; Sep. 19, 1992 (Section: vol. 9; No. 50; Sec 2; p. 10; Milwaukee; WI, US).
IRS releases rough online outline of global trading tax deals; Pratt, tom.; The Investment Dealers Digest: IDD. New York, Apr. 18, 1994.
JP Office Action for Application No. 2008-524246 dated Nov. 9, 2010; 6 pages (including English Translation).
JP Office Action for Application No. 2008-524247 dated Feb. 22, 2011; 5 pages (including English Translation).
JP Office Action for Application No. 2008-524208 dated Feb. 22, 2011; 6 pages (including English Translation).
U.S. PTO Office Action for U.S. Appl. No. 11/495,235; 19 pages; Sep. 28, 2010.
Extended EP Search Report for EP Application No. 06788951.9 dated Nov. 4, 2010; 7 pages.
Extended EP Search Report for EP Application No. 06788951.9 dated Nov. 4, 2010; 6 pages.
U.S. Office Action for U.S. Appl. No. 12/888,796 dated Nov. 25, 2011; 12 pages.
U.S. PTO Office Action for U.S. Appl. No. 12/115,313; 13 pages; Aug. 24, 2011.
USPTO Office Action for U.S. Appl. No. 11/213,601 dated Sep. 1, 2011; 22 pages.
USPTO Notice of Panel Decision for for U.S. Appl. No. 10/023,241; 2 pages; Jun. 17, 2011.
U.S. PTO Office Action for U.S. Appl. No. 11/495,235 21 pages; Aug. 19, 2011.
CA Examiner Report for Application No. 2616772 dated Mar. 29, 2012; 4 pages.
CA Examiner Report for Application No. 2616388 dated Feb. 14, 2012; 3 pages.
CA Examiner Report for Application No. 2616850 dated Apr. 4, 2012; 4 pages.
EP Office Action for EP Application No. 06788951.9 dated Nov. 30, 2011; 8 pages.
AU Examiner Report for Application No. 2011204873 dated Feb. 14, 2012; 1 page.
AU Examiner Report for Application No. 2011205039 dated Mar. 30, 2012; 1 page.
AU Examiner Report for Application No. 2011205038 dated Mar. 30, 2012; 1 page.

* cited by examiner

| | bid | offer | size | | commission |
| --- | --- | --- | --- | --- | --- |
| | | | bid | offer | |
| 2 year | | 801 | | | |
| 5 year | 100.19 | 100.22 | 100 | 200 | 0 |
| 10 year | | | | | |
| 30 year | | | | | |

| | |
| --- | --- |
| customer id | 0021645 |
| commission agreement | master |
| aggressor | no |
| instrument liquidity | high |
| total volume entered into | 3400 |
| total number traded | 1000 |

Monday, April 1, 2002 2:37 pm

FIG. 8

COMMISSION CALCULATOR AND DISPLAY

This application claims priority from U.S. application Ser. No. 10/345,466, filed Jan. 14, 2003, issuing as U.S. Pat. No. 7,707,097 on Apr. 27, 2010, which is incorporated by reference.

BACKGROUND

This invention relates to the calculating and displaying of commissions relating to the trading of financial instruments. Specifically, this invention relates to the calculating and displaying of commissions charged for trading variable or fixed interest-rate-related instruments—e.g., United States Treasury Bonds, Notes, or Bills, United Kingdom Gilts, European government bonds, and emerging market debts, swaps, repos, etc.

In non-electronic trading of interest-rate-related instruments, two classes of individuals are typically involved in the trading: traders and brokers. Typically, traders purchase or sell the securities or instruments. Brokers match traders acting as buyers to traders acting as sellers in order to facilitate the purchase or sale of the interest-rate-related instrument. The purchase, sale, or other transaction involving the interest-rate-related instruments is known, and referred to herein as a trade.

Historically, one of the problems associated with this system was the lack of direct communication between the two traders transacting the trade of the interest-rate-related instrument. This lack of direct communication allows the broker to fictionalize one side of the trade to the counterparty on the other side of the trade. This fictionalization allows the broker to decrease the actual spread between a buy and a sell position while maintaining the positions of the parties as perceived by the parties themselves.

For example, assume that a seller had taken a position that he would not sell a particular interest-rate-related instrument for less than $50 per instrument, while the buyer had taken a position that he would not pay for more than $48 per instrument. At this point in the negotiation, the seller may indicate to the broker that he would accept $49 per instrument while the buyer may indicate to the broker that he would pay $49 per instrument. Nevertheless, the broker may not communicate the respective communications to the respective counterparties. Rather, the broker may inform each counterparty that the other is steadfast in his respective position. Alternatively, the broker may indicate a slight movement, either to an offer to buy of $48.50 from the prospective buyer or to an offer to sell of $49.50 from the seller, or both. Whether the broker has only communicated the first, unchanged, offer or a slightly changed offer, the respective traders may transact the trade of the interest-rate-related instrument at a price other than the price they agreed to. In this particular example, the buyer may believe that he must pay $50 (or $49.50) while the seller may believe he will receive only $48.00 (or $48.50). The $2.00 (or $1.00) between the amount actually received and the actually amount actually paid in each trade becomes excess profits, for the broker over and above the known brokerage fee. Further compounding the problem may be that excess broker profits and the concomitant distortion of the true market price based on the excess profits, are concealed from the buyer and seller.

A similar problem may exist in electronic trading of interest-rate-related instruments as well. In electronic trading, the trading logic used by the trading system or platform (which operates similarly to a voice broker in non-electronic trading) may not be fully disclosed by the system or platform. This lack of full disclosure by the electronic trading system prevents the customers (similar to traders in non-electronic trading) from being fully aware, until perhaps a much later time, of the brokerage charges being charged to them by the electronic trading system.

It would be desirable to provide an electronic trading system and method for the trading of interest-rate-related instruments that fully and clearly discloses the brokerage fees charged to the customers.

It would also be desirable to provide an electronic trading system and method for the trading of interest-rate-related instruments that fully and clearly discloses the brokerage fees charged to the customers in real time. "Real time" should be understood to suggest immediacy, subject only to normal electronic processing delay and interruptions. Whether or not a user experiences a significant delay before receiving information or a response in real time (in this context) may depend upon the capabilities of the user's system, the server system and any intervening network, or the efficiency of an external data source.

It would also be desirable to provide an electronic trading system and method for the trading of interest-rate-related instruments that informs the customers of the factors which form the basis for the calculation of the brokerage fees.

It would also be desirable to provide an electronic trading system and method for the trading of interest-rate-related instruments that provides an opportunity to customers to influence the factors for the calculation of the brokerage fees charged to the customer.

SUMMARY

In general, in a first aspect, the invention features an apparatus that displays commissions for a trade of an interest-rate-related instrument. A server has a server storage device; a server processor connected to the server storage device, the server storage device storing a server program for controlling the server processor. The server processor is operative with the server program to execute a trade of the interest-rate-related instrument between a first party and a counterparty. A plurality of workstations are each operative to communicate with the server. Each workstation has a workstation storage device; a workstation processor connected to the workstation storage device, the workstation storage device storing a workstation program for controlling the workstation processor. The workstation processor is operative with the workstation program to receive information relating to the interest-rate-related instrument, display a commission on the trade to the first party or the counterparty before, during, or after the execution of the trade, and to allow the first party or the counterparty to modify the trade information in order to influence the commission.

In general, in a second aspect, the invention features a system that calculates and displays a commission for a trade of an interest-rate-related instrument between a first party and a counterparty. A server executes the trade and calculates the commission for the trade before, during, or after the execution of the trade. A plurality of workstations electronically display the commission and information relating to the trade of the interest-rate-related instrument to the first party or the counterparty, the server operative with at least one of the plurality of workstations to allow the first party or the counterparty to modify the information relating to the trade of the interest-rate-related instrument in order to influence the commission.

In general, in a third aspect, the invention features a method for displaying commission information for a proposed trade of an interest-rate-related instrument to a customer trading in such an instrument. An interactive view region is displayed to the trader, the interactive view region which displays commission information. A bid or offer position on the interest-rate-related instrument is received from the customer. The bid or offer position is displayed to the customer in an interactive view region. The customer is allowed to modify the bid or offer position in order to influence a commission on the proposed trade. The bid or offer position and the commission are displayed to the customer in an interactive view region. The trade is executed. The commission on the trade is displayed in the interactive view region to the customer.

Embodiments of the invention may include one or more of the following features. The system may include a clearing center coupled to the server, that causes the trade to be completed and cleared and that verifies that the trade is completed and cleared. The clearing center may be operative to communicate with the server. The clearing center may include a clearing storage device; a clearing processor connected to the clearing storage device, the clearing storage device that stores a clearing program for controlling the clearing processor. The clearing processor may be operative with the clearing program to cause the trades to be completed and cleared and to verify that the trades are completed and cleared. The server processor may include a commission calculation processor for calculating the commission for the trade. The server may include a commission calculation processor for calculating the commission for the trade; and a trade processor coupled to the commission calculation processor for executing and processing the trade. The server processor may be operative with the server program to calculate the commission for the trade before the execution of the trade. The server processor may be operative with the server program to calculate the commission for the trade substantially simultaneously as the execution of the trade. The server processor may include a trade processor for executing and processing the trade. The system may allowing the customer to modify the type of his commission agreement in order to influence the commission. The commission on the proposed trade may be calculated based on the bid or offer position. Each workstation may be adapted to display a bid or an offer on the interest-rate-related instrument to the first party or the counterparty in an interactive view region. The server may be adapted to arrange the information relating to the interest-rate-related instrument based on a predetermined protocol. The bid or offer position may be arranged to be displayed with respect to other bid and offer positions entered by other customers based on a predetermined protocol. The information relating to the interest-rate-related instrument may include the type of commission agreement pertaining to the first party and the counterparty. Calculating the commission may be based on the type of customer commission agreement. The information relating to the interest-rate-related instrument may include the type of interest-rate-related instrument. The information relating to the interest-rate-related instrument may include the bid or offer size. The calculating the commission is further based on the proposed bid or offer size. The information relating to the interest-rate-related instrument may include the dollar amount of the bid or offer on the interest-rate-related instrument. The commission may be calculated based on the dollar amount of the bid or offer.

An electronic trading system and method may provide trading of interest-rate-related instruments that fully and clearly discloses the brokerage fees or commissions charged to the customers.

An electronic trading system and method may provide for the trading of interest-rate-related instruments that fully and clearly discloses the brokerage fees or commissions charged to the customers in real time.

An electronic trading system and method may provide for the trading of interest-rate-related instruments that informs the customers of the factors which form the basis for the calculation of the brokerage fees or commissions.

An electronic trading system and method may provide for the trading of interest-rate-related instruments that provides an opportunity to customers to influence the factors for the calculation of the brokerage fees or commissions charged to the customer.

To better appreciate the following details, the nomenclature is defined below. The illustrative examples herein, but not limited to them, all focus on fixed-income and fixed-income-related instruments, as well as the trading of these instruments—with the volume of a given trade delineated in, but not limited to, dollars—e.g., $25 million of 10-year Treasury Notes.

The following terms are used with the associated definitions:

| | |
|---|---|
| Bid | Dollar or yield amount bid to buy a secutiry (issue) |
| Offer | Dollar or yield amount offered to sell a security (issue) |
| Spread | Difference between best bid(s)--i.e., highest price limit for buy orders -- and best offer(s)--i.e., lowest price limit for sell orders |
| Issue | A single or selected class of interest-rate-related securities--e.g., the most recently issued 10-year Treasury Notes. |
| Participant | A person or controlling entity receiving data on trading and responding thereto. While the participant is often a terminal operator or broker acting on behalf of a customer (e.g., a trader), this is not the only arrangement. For example, the customers may interact as participants directly. Other arrangements are also possible. |
| Hit | Accept a pending Bid |
| Take or Lift | Accept a pending Offer |
| Size | The number of issues of a particular bid/offer |

A computer-based data processing system for displaying and adjusting trade information as well as commission information relating to a trade may further calculate a commission based on the trade and display it, along with the trade and commission information to a user of such a system. The data processing system employs a plurality of trading workstations linked with a server for coordinated data flow and processing. The system may display the commissions on electronically executed trades of, preferably primarily although not necessarily, interest-rate-related instruments, and may include: a processor adapted to calculate a commission of a selected trade of such an instrument, workstations adapted to display the commission of the selected trade prior to, during, or after the execution of the trade. The workstations may also be adapted to display and allow the user to modify the factors relating to calculation of the commission.

DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 8 is an illustration of an interactive view region that may be displayed to a user.

DESCRIPTION

Figure 1:
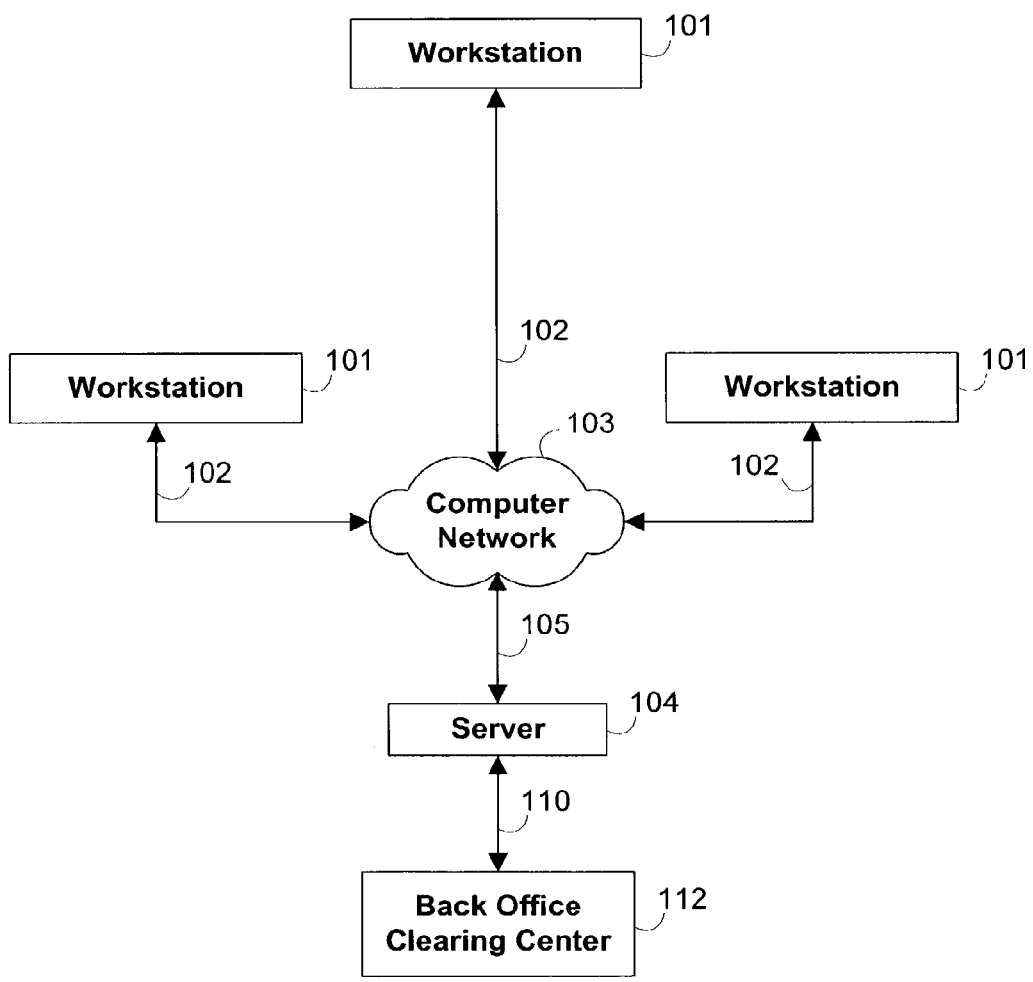
FIG. 1 is a block diagram of a system.

Referring to FIG. 1, exemplary system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, data processing device, or combination of the same. Server 104 may be used to process and settle the executed trades, calculate commissions for potential trades as well as for actual trades, and provide information that may be used to display calculated commissions.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 101 may be used to enter into and proceed with trades, and display trade and/or commission information to users of system 100.

Back office clearing center 112 may be any suitable equipment, such as a computer, a laptop computer, a mainframe computer, etc., or any combination of the same, for causing trades to be cleared and/or verifying that trades are cleared. Communications link 110 may be any communications links suitable for communicating data between server 104 and back office clearing center 112, such as network links, dial-up links, wireless links, hard-wired links, etc.

Figure 2:
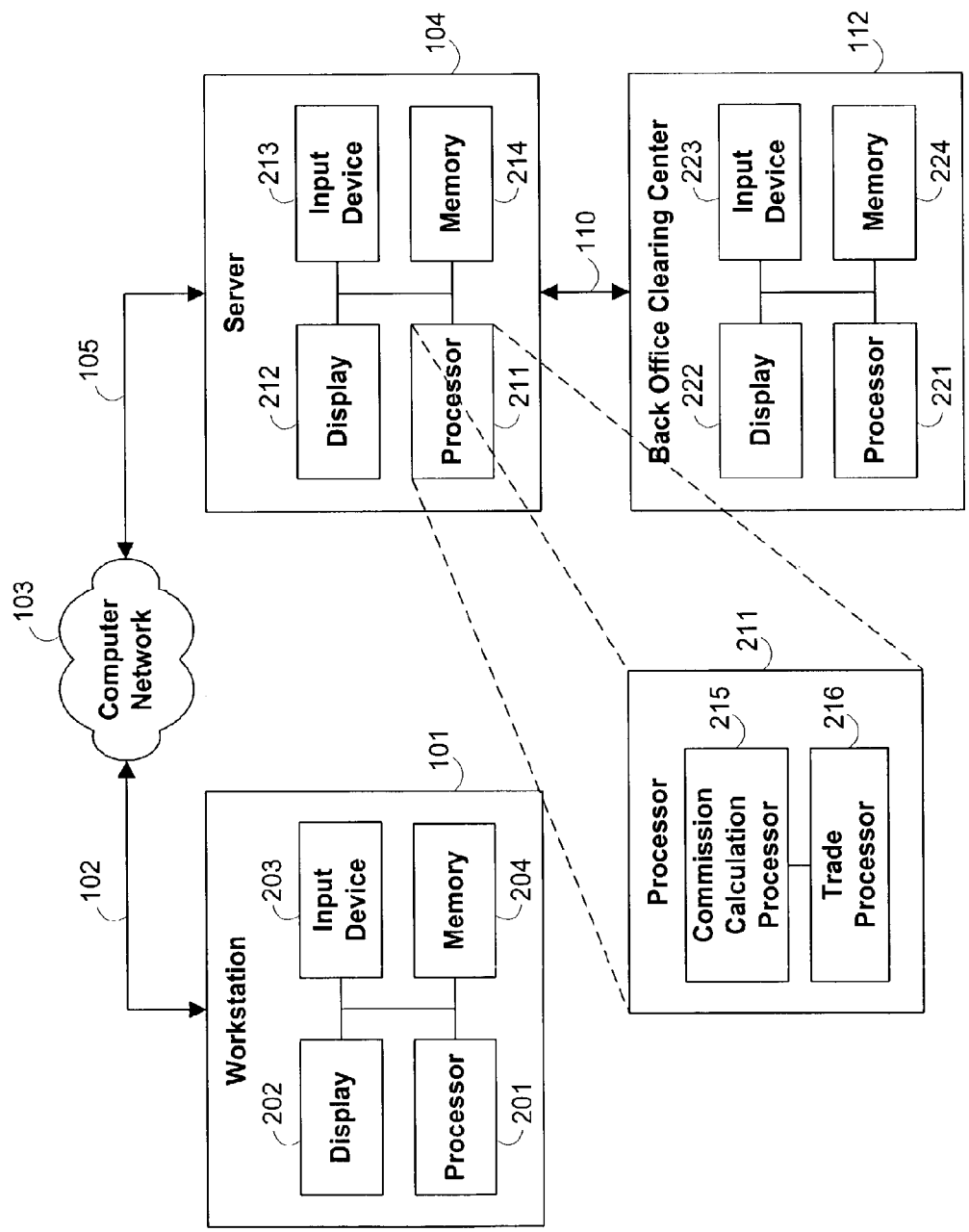
FIG. 2 is a block diagram of a workstation, a server, and a back office clearing center.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. Memory 204 may contain a storage device for storing a workstation program for controlling processor 201. Processor 201 may use the workstation program to present on display 202 trade information relating to bids, offers, executed trades, and commission information to a user of workstation 101. Furthermore, input device 203 may be used by the user to enter such bids and offers, modify them, and to enter into trades involving the interest-rate-related instruments.

Server 104 may include processor 211, display 212, input device 213, and memory 214, which may be interconnected. Memory 214 may contain a storage device for storing trade information as well as commission information. The storage device further contains a server program for controlling processor 211. Processor 211 uses the server program to transact the purchase and sale of the interest-rate-related instruments. Processor 211 may include commission calculation processor 215 that determines the commissions based on market conditions or other criteria that may relate to the commissions. Processor 211 may include trade processor 216 that executes and processes trades.

Back office clearing center 112 may include processor 221, display 222, input device 223, and memory 224, which may be interconnected. Memory 224 may contain a storage device for storing a clearing program for controlling processor 221. Processor 221 uses the clearing program to clear executed trades, thereby facilitating the transfer of securities resulting from the executed trades. Clearing executed trades may include exchanging currency for an instrument.

Figure 3:
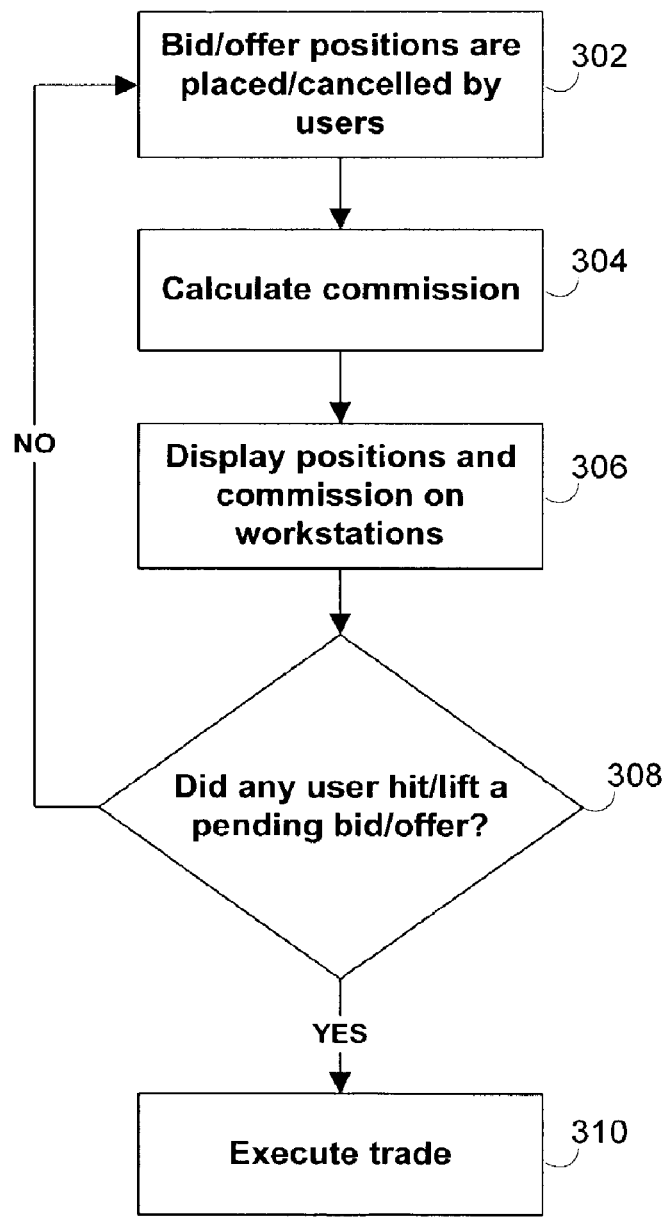
FIG. 3 is a flow diagram of a process that may be used in the execution of a trade.

Referring to FIG. 3, process 300 may be implemented on system 100 of FIGS. 1 and 2. In process 300, a user may place one or more bids and/or offers for a defined class of securities, at step 302. The user may be the customer himself, a broker acting on behalf of the customer, or any other member of the group defined above as participants.

The system may therefore receive the bid/offer positions entered by the user. Next, the commission for the potential trade may be calculated at step 304, based on the received information. Commission calculation, which will be described in more detail in relation to FIG. 5, may be implemented by commission calculation processor 215, shown in FIG. 2. At step 306, the entered bid/offer positions may be displayed along with the calculated (albeit prospective) commission for the pending trade. A workstation display, such as element 202 of FIG. 2, may be used to display the bid/offer positions and commission information to the user, as will be discussed in more detail in FIG. 8.

It should be noted that, in selected embodiments, payment of commission may be received only from the aggressing party—i.e., the party that either hits the bid or lifts the offer. In other embodiments, the commission may be received from each party involved in the transaction.

The positions that are still pending, along with the commissions associated with each trade based on such positions, may be arranged and displayed in priority according to a predetermined protocol. A user may establish priority by placing a bid or offer at a select price and size. Priority may be based upon time of submission, price, size, or any other suitable criterion. By way of example, the highest bid may be displayed on the screen above other bids, and bids at the same price may be displayed in the time order in which they enter the system.

Once the bid and offer positions are displayed on the workstations, they may be accepted by another user, or counterparty. Process 300 then determines whether any user has accepted a pending bid or offer at step 308. Once a user has accepted a pending bid or a pending offer, the trade may be executed at step 310 and the commission pertaining to the executed trade may be displayed again to the user for confirmation. Trade processor 216, shown in FIG. 2 may be used to execute and process the trade at step 310. If no customer accepts a pending bid or offer at step 308, no trade will be executed and the display on the screen may remain the same unless a user places or changes a bid or offer at step 302.

Figure 4:
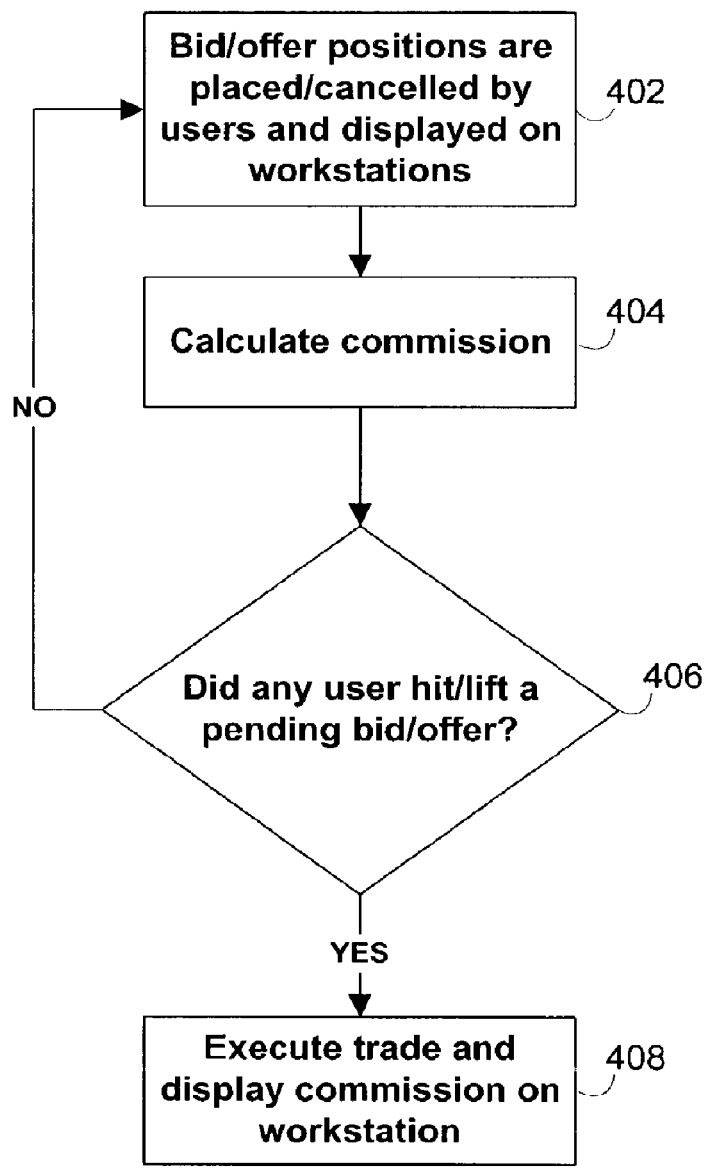
FIG. 4 is another flow diagram of a process that may be used in the execution of a trade.

Referring to FIG. 4, process 400 may be implemented on system 100 of FIGS. 1 and 2 as well. In process 400, the user may place one or more bids or offers for a defined class of securities, at step 402. The entered bid or offer positions may be arranged according to the predetermined protocol mentioned above, which may be implemented by server 104 of FIGS. 1 and 2. The bid or offer positions may also be displayed to the user on workstation 101 of FIGS. 1 and 2. The commission for the potential trade may then be calculated at step 404, based on the received information, using commission calculation processor 215, shown in FIG. 2.

Next, process 400 may determine whether any user has accepted a pending bid/offer at step 406. If no customer accepts a pending bid or offer at step 406, no trade will be executed and the display on the screen may remain the same unless a user places or changes a bid or offer at step 402. Once a user accepts a pending bid/offer, the trade may be executed at step 408 by trade processor 216, shown in FIG. 2. The commission that is calculated based on the executed trade may be displayed to the user at step 408 as well.

Figure 5:
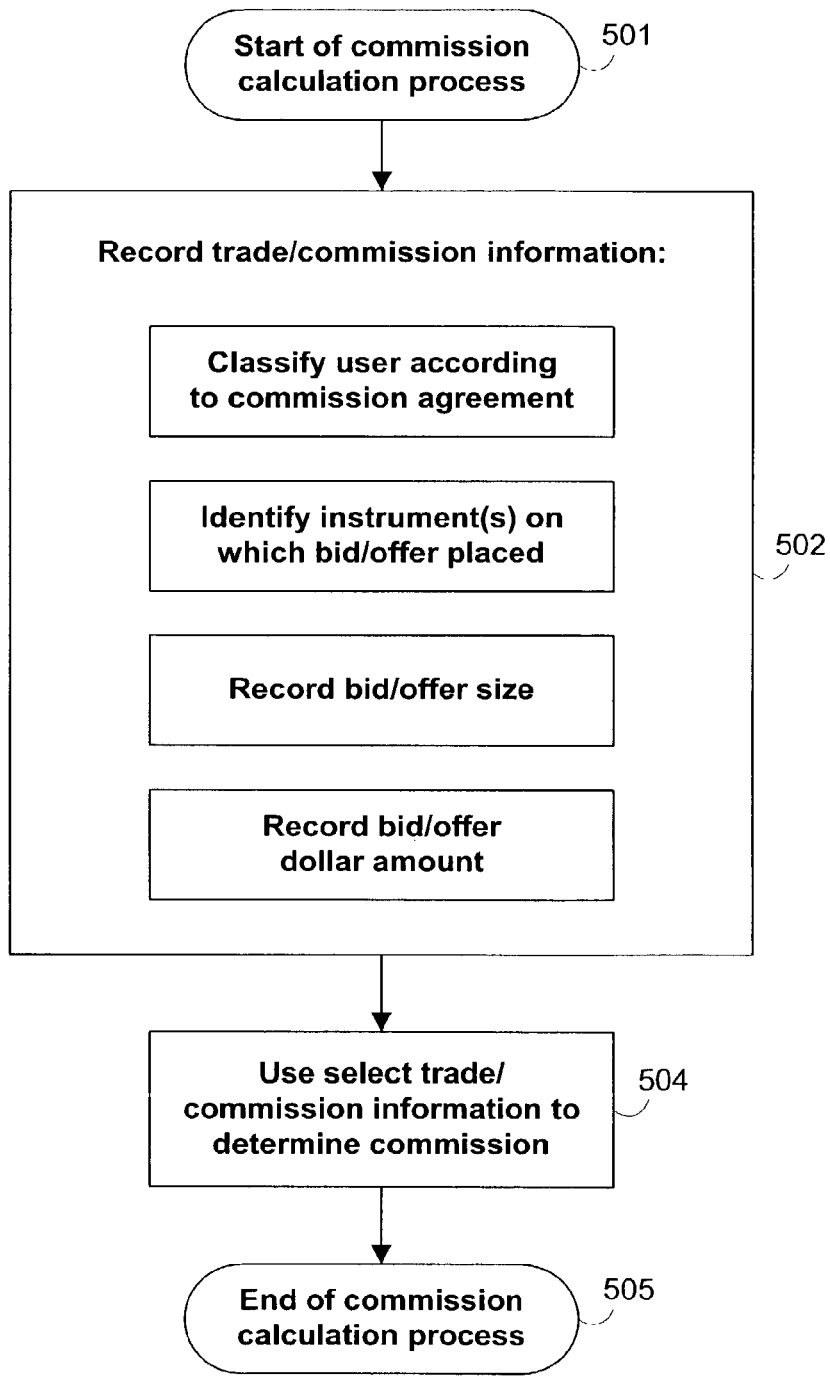
FIG. 5 is a flow diagram of a process that may be used in the calculation of a commission pertaining to a trade.

Commission calculation according to steps 304 or 404 of FIGS. 3 and 4 may be implemented by process 500 shown in FIG. 5. Commission calculation processor 215, shown in FIG. 2, may be used to run process 500. Referring to FIG. 5, process 500 may start at step 501. Process 500 may collect and record information relating to the calculation and allocation of the commission associated with the position entered by the user at step 502. Such information may include the user commission agreement type, the specific type or class of instrument on which bids/offers were placed, the bid/offer size, and/or the dollar amount per bid/offer.

Users may be classified according to their type of commission agreement at step 502. For example, some users may have an agreement for a flat periodic rate (monthly, yearly, etc.) for their commissions. These users would be charged the same monthly or yearly rate regardless of the number of transactions they make. Such users may be classified as ones having a "Master Agreement." Other users may have to pay a commission for each transaction they participate or, alternatively, in each transaction in which they aggress. Such users may be classified as ones having a "Transaction" type agreement.

In addition, the instrument or instruments on which bids/offers are placed by a particular user are identified, at step 502, according to whether they pertain to a particular class of financial instruments such as interest-rate-related securities, currencies, equities, and their derivatives, or whether they represent bonds, currency, stocks, options, etc. They may even be classified in more detail according to, for example, their year-to-maturity. Also, for each one of these instruments, the bid/offer size and dollar amount placed by a user may be recorded. Such trade information (or position-specific information), as well as other suitable commission information may be used to calculate the commission on the potential trade that may take place if the user were to hit/lift one or more pending bids/offers or, alternatively, have his bid hit or his offer lifted.

At step 504, the trade and commission information gathered in step 502 is used to determine the dollar amount of the commission that may be charged to the user. In some cases this dollar amount may be zero. For example, if the information recorded for a particular user reveals that the user has a master agreement for a fixed annual sum of money, then the marginal cost of a transaction will be zero unless a designated increment stated in the user's contract is specified.

FIGS. 3 and 4 show commission calculation steps 304 and 404 occurring prior to the execution of the trade. In order for the commission to be fully and clearly disclosed to the user prior to the user hitting or lifting a pending bid or offer as shown in FIG. 3, commission calculation step 304 may take place prior to the execution of the trade. The same is not necessarily true with respect to FIG. 4 because the commission need not be displayed until the trade is executed. However, there may be other advantages for step 404 to take place prior to steps 406 and 408. Some of these advantages are discussed below.

Although some users may not complete or fully engage in a transaction, they may still participate in some aspects of a trade. For instance, those users may post bids or offers, or browse through posted bids and offers in search of potential hits or lifts. In doing so, such users may provide the market with additional liquidity. Step 502 of FIG. 5 may be used to characterize such users by gathering information relating to the potential transactions in which they may be considered participants. For example, the volume of bids and offers placed on a specific instrument by a particular user may be used as a measure of liquidity added to a rarely traded instrument, or may be an indication as to whether the user is a relatively new participant. Such user behavior may warrant an increase in the user's credit line or margin requirement, thereby benefiting the user. This type of determination is made possible through step 502 of FIG. 5.

Figure 6:
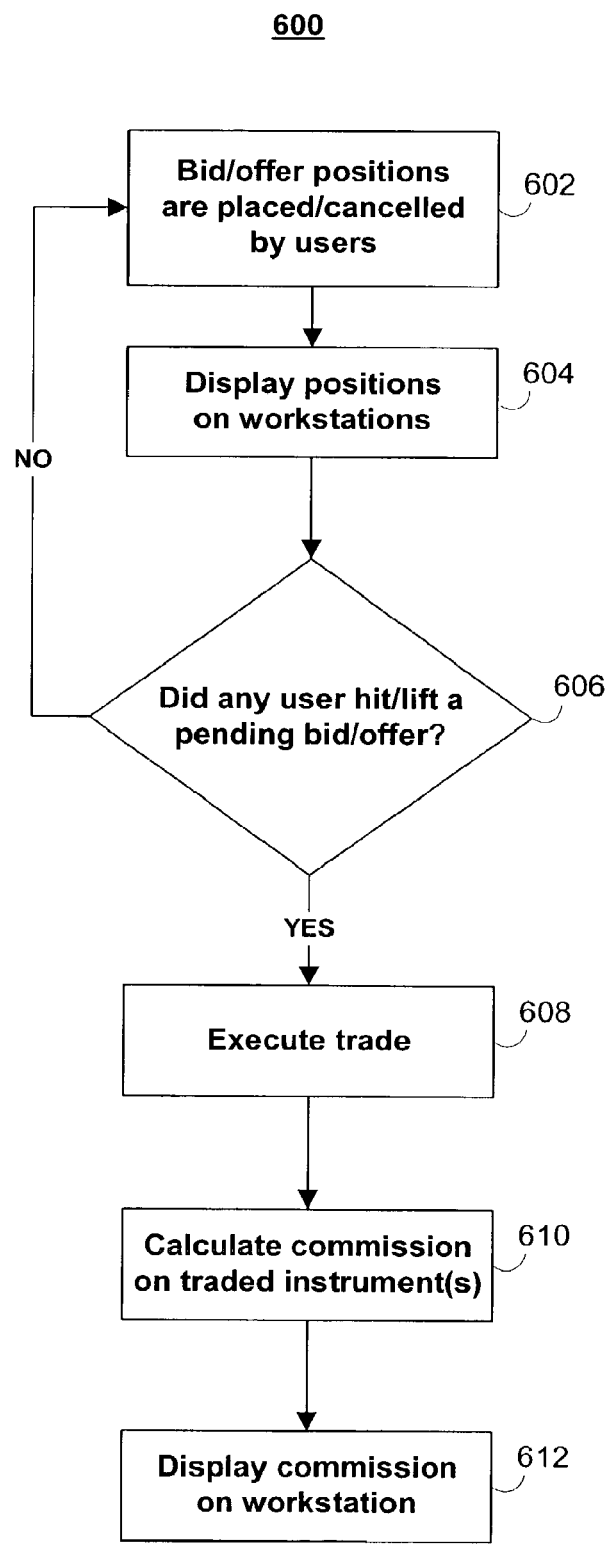
FIG. 6 is yet another flow diagram of a process that may be used in the execution of a trade.

Referring to FIG. 6, commission calculation need not take place until the trade is executed. Process 600 of FIG. 6, which may be implemented on system 100 of FIGS. 1 and 2, starts at step 602. At step 602, the user may place one or more bids or offers for a defined class of securities. The bid and offer positions are displayed on the workstations at step 604 and may be accepted by the user at step 606. If no customer accepts a pending bid or offer at step 606, no trade will be executed and the display on the screen may remain the same unless a user places or changes a bid or offer at step 602. Once a user accepts a pending bid or offer, the trade may be executed at step 608 by trade processor 216, shown in FIG. 2.

After the trade is executed, the commission on the trade may be calculated based on the instruments that were involved in the completed transaction at step 610, and displayed to the user at step 612. The commission calculation may be implemented by commission calculation processor 215 or FIG. 2, in accordance with process 500 of FIG. 5. Instead of identifying the type, size and dollar amount of instruments on which bids/offers were placed, however, the type, size, and dollar amount of instruments that were transacted in the executed trade are identified and recorded.

Figure 7:
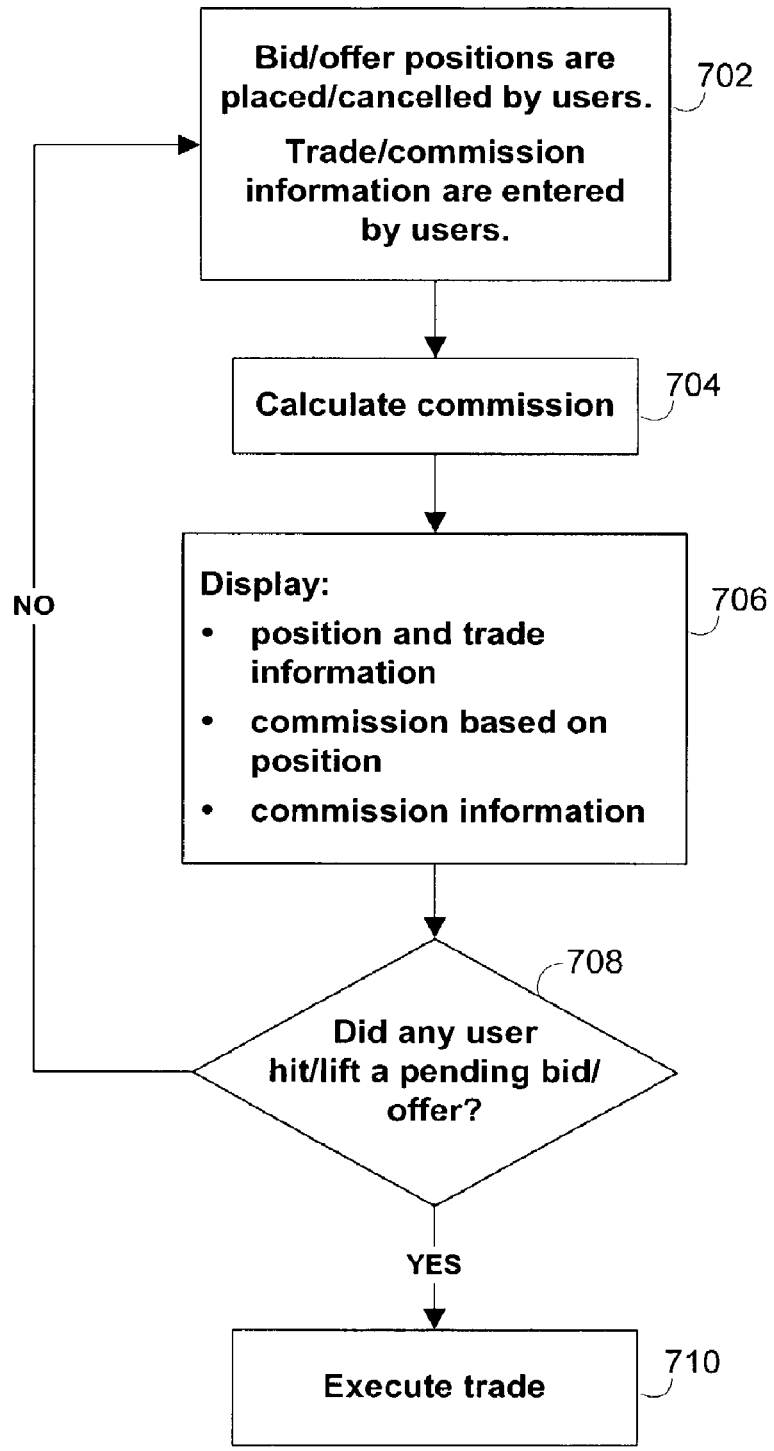
FIG. 7 is another flow diagram of a process that may be used in the execution of a trade.

It may however be more desirable to provide a method for electronically trading that fully and clearly discloses the commission charged to the users prior to the execution of the trade as shown in FIG. 3. In addition, it would be advantageous to inform the user about the factors that form the basis for the calculation of the commission, so that the user may have a better understanding of the process involved in allocating the commission, and so that he may influence such factors. FIG. 7 illustrates a process that enables the user to view and/or control such factors.

Process 700 of FIG. 7 may be implemented on system 100 of FIGS. 1 and 2. The user may place one or more bid and/or offer for a defined class of securities, at step 702. The user may also enter or change his trade information, commission information, or both. For example, the user may modify his type of commission agreement, at step 702.

As a security arrangement, each particular agreement may be associated with a code that may match the user's location and/or other identifying features. Furthermore, a particular commission agreement identifier may ensure that the user does not change his particular information to an agreement that is more beneficial to him. Thus, a double key may be set up between the trading system and the user whereby each party enters a particular code such that the commission agreement may not be changed by either party unilaterally.

Next, the commission for the potential trade may be calculated at step 704, based on the information entered by the user and identified by the system. Commission calculation may be implemented by commission calculation processor 215, shown in FIG. 2, and in accordance with process 500 of FIG. 5. At step 706, the entered bid/offer positions, trade information, and/or calculated commission may be displayed along with the user's commission information. A workstation display, such as element 202 of FIG. 2, may be used to display an interactive view region on which the bid/offer positions and commission information may be shown to the user. Such an interactive view region is illustrated in and discussed in conjunction with FIG. 8.

After the positions and commissions are displayed to the user at step 706, process 700 may determine whether any user hit/lifted a pending bid/offer at step 708. After learning the potential commission that he may be charged, the user may choose to modify some of the information entered in order to influence the calculated commission. At step 708, the user may be prompted as to whether the displayed trade information and/or commission information is accurate or acceptable. By not accepting or by choosing not to hit or lift any pending position, the user may be taken back to step 702 where he may enter or update his positions and/or commission information. For example, by changing his type of commission agreement and/or size of bids/offers, the user may reduce the total dollar amount of commissions charged to him or, alternatively, reduce the amount of commissions on a per contract basis. The user may also choose to place bids/offers on less liquid instruments. Participation in markets of less liquid instruments may also benefit the user by rewarding him for such participation, as described above. A workstation, such as element 202 of FIG. 2, may be used to display a dialog box that allows the user to enter/modify trade information and/or enter the changes relating to his commission information, as discussed above. Such a dialog box is illustrated in and discussed in conjunction with FIG. 9.

Once a user has accepted a pending bid or a pending offer, the trade may be executed at step 710 and the commission pertaining to the executed trade may be displayed again to the user. Trade processor 216, shown in FIG. 2 may be used to execute and process the trade at step 710. If no customer accepts a pending bid or offer at step 708, no trade will be executed and the display on the screen may remain the same unless a user places or changes a bid or offer, or unless the user changes the trade and/or commission information at step 702.

Information relating to the positions placed by a user as well as the user's commission information may be provided to the user. Interactive region 800 illustrated in FIG. 8 may display such information to the user on display 202 of workstation 101 of FIG. 2. Interactive region 800 may be customized by each user and may contain selectively configured screen regions 81, 82, and 83. Each region may be dedicated to a type of instrument being traded. For example, region 81 may relate to U.S. treasury securities, wherein subregion 810 is specific to 2-year treasury securities, subregion 812 to 5-year treasury securities, subregion 814 to 10-year treasury securities, etc. For each particular type of issue, the latest key trading indicators may be displayed within a subregion, such as: the bid, the offer, the bid/offer sizes, and the commission charged to the user. The user may customize the subregion to display other information, such as the latest settling price or the total volume traded by the particular user. The user may also mark each component within a particular subregion with a color, or in any other suitable manner, to indicate features of that component, facilitate viewing of each component, or both. Other information particular to treasury securities may also be displayed, such as: the issue date, the maturity date, the interest rate, the calculated yield, etc. The information displayed may be updated in real-time as the different instruments are traded.

In addition, window 888 may display information that is specific to the user or that relates to the commissions he may be charged. Such information may include the user or customer identification number, the user's commission agreement type, whether or not the user is an aggressor in a particular transaction, the liquidity of the particular instrument selected by the user, the total volume of trades the user participated in or entered into, the current date and time, or other suitable information.

In order to select a particular issue, the user may move box 801 to the desired area within a subregion through his keyboard, mouse, or any type of input device such as element 203 of workstation 101 depicted in FIG. 2. Once the user selects a particular issue, he may place or cancel one or more bid/offer on it, hit/lift a particular bid/offer, change his commission agreement, or simply move to a different issue again using the input device. For example, FIG. 8 shows box 801 highlighting an offer to sell 200 issues of 5-year treasury notes at $100.22 each. This particular instrument is indicated to be highly liquid, and is not associated with a marginal commission because this particular user's commission agreement reflects a master type agreement. In this example, the treasury note bid and offer prices, as well as the commission on the trade, are expressed in real dollar amounts. Alternatively, the bid/offer prices may be expressed in terms of basis points. Also, the commission on any particular transaction may be expressed in terms of a percentage of a basis point or a percentage of the spread of the transaction. The user may select the manner in which such trade and commission information are displayed.

As will be discussed in detail in the following, the user may transact any one of the instruments shown in FIG. 8 by bidding for, offering, buying or selling the instrument shown within a particular subregion. Moreover, the user may build multiple transactions or a multi-legged transaction on the same instrument. For example, the user may bid for certain issues of 5-year treasury notes and offer certain issues of the same 5-year treasury notes for sale at a different time, hoping that price fluctuations relating to this particular instrument may be to his advantage. The user may use interactive region 800 to do so. The commissions on each of these transactions may be calculated, combined and displayed as a commission on a single multi-legged transaction in interactive region 800.

In order to bid for, offer, buy or sell an instrument shown within a subregion, the user may submit a trading command indicating the action to be taken using different methods. For example, the user may submit the trading command using a command-line interface, by moving box 801 of FIG. 8 through his keyboard to any location within a particular subregion and manually enter a command line on his keyboard. The keyboard may also include buttons specifically designed to enter specific trade commands. Alternatively, the user may use a mouse or pointing device to move box 801 to a particular component within a specific subregion and press the button on the pointing device that is associated with a particular trade command. The user may alternatively use some combination of both a keyboard and pointing device to enter trade commands, particularly when building multi-legged transactions. In any event, the aforementioned keyboard and pointing device may be types of input devices provided to the user as part of an associated workstation, as depicted in FIG. 2. The user may use such an input device to modify at least some of the information displayed in window 888 of FIG. 8 as well.

Figure 9:
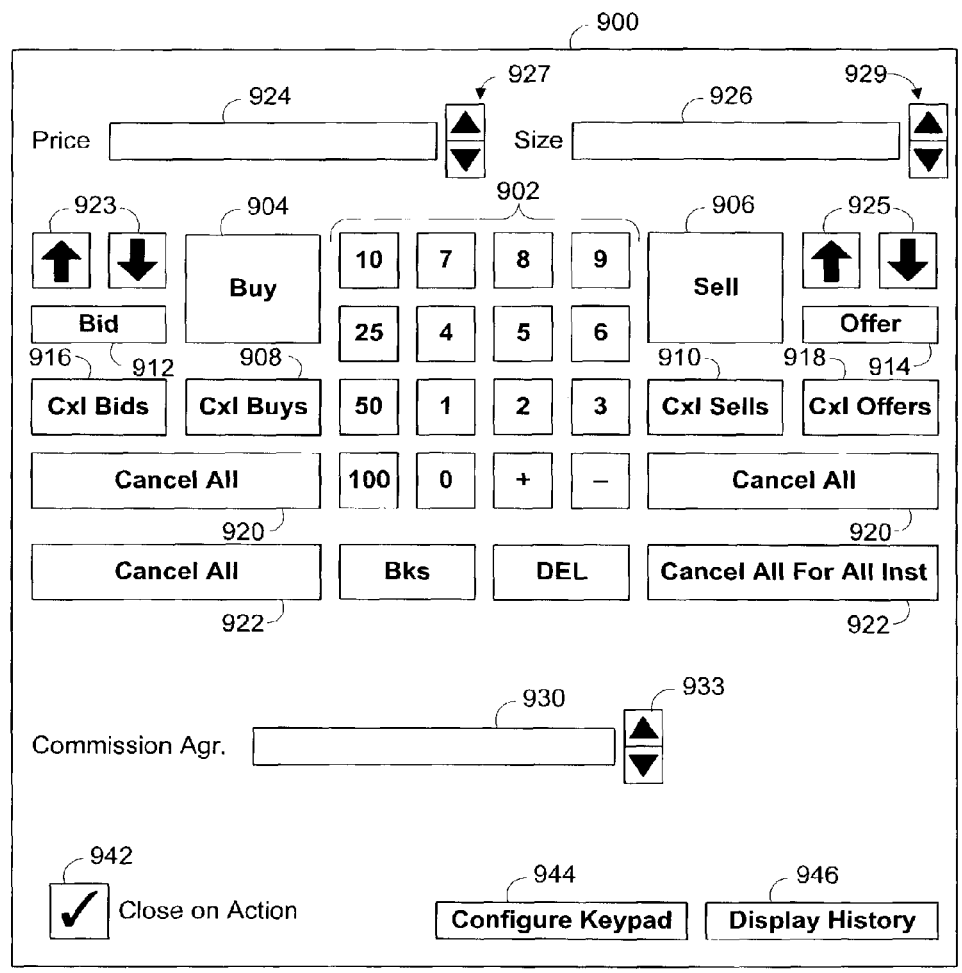
FIG. 9 is an illustration of a dialog box that may be displayed to a user.

In another embodiment, selecting a particular instrument displayed in interactive view region 800 may open a dialog box that is displayed to the user on the same screen. Such a dialog box is illustrated in FIG. 9. Dialog box 900 may be a graphical interface for submitting trading commands. Dialog box 900 may be opened automatically and/or manually before, during, and/or after a trade, and may allow the user to submit a trade command at any time. A dialog box may be dedicated to each type of instrument available in interactive view region 800 of FIG. 8, such that many dialog boxes may be open and kept open at any one time. Dialog box 900 may contain buttons and entry fields 902-946. Buttons and entry fields 902-929 may be used to submit a bid command, an offer command, a buy command, or a sell command for an instrument corresponding to a particular subregion in FIG. 8. Buttons and entry fields 930 and 933 may be used to enter or change the user's commission agreement type. Box and buttons 942-946 may be used to change certain options available within dialog box 900, and list a history of transactions.

A particular set of buttons in dialog box 900 constitute a numeric keypad 902 that may provide buttons for numbers zero through nine, and may contain buttons for numbers ten, twenty-five, fifty, and one hundred or any other suitable or desirable values. Numeric keypad 902 may also contain a plus button ("+"), a minus button ("−"), a decimal point button ("."), a backspace button ("BKS"), and a delete button ("DEL").

In addition, dialog box 900 may also provide the user with a buy button 904, a sell button 906, a cancel buys button 908, a cancel sells button 910, a bid button 912, an offer button 914, a cancel bids button 916, a cancel offers button 918, cancel all buttons 920, cancel all for all instruments buttons 922, a price entry field 924, price up and down buttons 927, bid price up and down buttons 923, offer price up and down buttons 925, a size entry field 926, and size up and down buttons 929.

Referring to FIG. 8, when a user selects an offer for a 5-year treasury note—e.g., by clicking on box 801 or pressing enter while the box is positioned under the offer column within subregion 812—dialog box 900 of FIG. 9 may pop-up (if not already open), and a pointer that is being used by the user may be immediately redirected to offer button 914 to save the trader the time of repositioning the pointer to that location. The user may then use any of buttons and entry fields 902-929 to modify his trade and/or position or cancel any given orders. Otherwise, or if the user does not wish to change the offer price or any other information relating to this particular offer, the user may press on the offer button to confirm and submit the trade command.

For example, assuming that the user wants to decrease the offer price to $100.20 with regards to the 5-year treasury note, he may press offer button 914 once and thereby cause offer price $100.22 (as illustrated in FIG. 8) to appear in price entry field 924. To decrease the offer price, he may press price down button 927, or press offer price down button 925. The user may then click on offer button 914 again to submit the offer. Alternatively, if the user does not want to alter the price, he may double click immediately on offer button 914.

Although the previous is an example of how a user may submit an offer to sell a particular instrument, the same features may be available in bidding for any instrument. Similarly, to buy or sell a desired number of issues of a particular instrument, buy and sell buttons 904 and 906 may be used, respectively, and in conjunction with size buttons 929.

Entry field 930 and buttons 933 of dialog box 900 may be used to change the user commission agreement. For example, if the user wishes to modify his commission agreement with respect to a particular instrument, he may bring up dialog box 900 by clicking anywhere within the subregion of FIG. 8 that is associated with the instrument and browse through the commission agreement options available to him by scrolling from one type that appears in entry field 930 to another by pressing buttons 933. The commission agreement implemented is the one displayed in field 930. Alternatively, the user may select a type of commission agreement that will globally apply to all the trades he may effectuate by clicking on the "commission agreement" field in window 888 of interactive view region 800 shown in FIG. 8, thereby causing dialog box 900 of FIG. 9 to appear, and selected his desired commission agreement type.

However, as mentioned before, a double key may be set up between the trading system and the user whereby each party entering into a transaction may enter a particular code such that the commission agreement may not be changed by either party unilaterally. Also, the user's customer ID may be used to ensure that the user does not change his particular commission information at will.

Dialogue box 900 of FIG. 9 may also contain close on action box 942 which, when selected, may cause dialogue box 900 to close automatically when the user performs a certain action such as complete a bid, offer, buy or sale. Configure keypad button 944 may be used to reposition the buttons and entry fields on dialog box 900, change the functions associated with these buttons and entry fields, or customize dialog box 900 according to the user's preferences. Finally, display history button 946 may cause a history list of order and trade entries to be displayed when pressed.

Interactive view region 800 and dialog box 900 of FIGS. 8 and 9, respectively, may be altered to display position or trade information, commission information, or both, in accordance with any of processes 300, 400, 600, and 700 of FIGS. 3, 4, 6, and 7, respectively. A particular user may place or accept positions, change the factors that influence the commission charged to him, or both, as discussed above.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. In many cases, one feature or group of features may be used separately from the entire apparatus or methods described. Many of those undescribed variations, modifications and variations are within the literal scope of the following claims, and others are equivalent.

The invention claimed is:

1. A computer of an electronic trading system, programmed to:
 distribute data to computers of counterparty customers of the electronic trading system, the distributed data describing a trading party's bid or offer proposing to trade a financial instrument, the counterparty computer programmed to arrange the counterparty's trading of the bid or offer based on a price for the bid or offer and a commission computed for the counterparty's transacting of at least a part of the bid or offer, the commission computed and recomputed substantially in real time based at least in part on data representing the bid or offer as modified by order-modifying customer instructions in a manner that influences the commission.

2. The computer of claim 1, wherein:
 the computation of commission is programmed to compute different commission amounts for the same bid or offer for different counterparty customers to whom the bid or offer is presented.

3. The computer of claim 1 wherein:
 at least some of the counterparty computers are workstations adapted to display a bid or an offer on the financial instrument to the respective counterparty in an interactive view region.

4. The computer of claim 1 wherein:
 the computation of commission is programmed to compute different commission amounts for the same bid or offer for different counterparties based on a type of commission agreement pertaining to the respective counterparty.

5. The computer of claim 1 wherein:
 the commission calculation is programmed to vary based on the type of financial instrument.

6. The computer of claim 1 wherein:
 the commission calculation is programmed to vary based on the bid or offer size.

7. The computer of claim 1 wherein the commission calculation is programmed to vary based on the dollar amount of the bid or offer on the financial instrument.

8. The computer of claim 1 wherein:
 the order-modifying customer is the customer that placed the bid or offer.

9. The computer of claim 1 wherein:
 the order-modifying customer is the counterparty customer to whom the bid or offer is presented.

10. The computer of claim 1 wherein:
 the commission is calculated for a multi-legged transaction.

11. A counterparty customer's workstation of a computer trading system, being programmed to receive information from one or more computers of the electronic trading system for trading of the financial instrument, the received information describing a trading party's bid or offer proposing to trade the financial instrument, the counterparty computer programmed to arrange the counterparty's trading of the bid or offer based on a price for the bid or offer and a commission computed for the counterparty's transacting of at least a part of the bid or offer, the commission computed and recomputed substantially in real time based at least in part on information representing the bid or offer as modified by order-modifying customer instructions in a manner that influences the commission.

12. The counterparty customer's workstation of claim 11 wherein:
 the order-modifying customer is the customer that placed the bid or offer.

13. The counterparty customer's workstation of claim 11 wherein:
 the order-modifying customer is the counterparty customer to whom the bid or offer is presented.

14. The counterparty customer's workstation of claim 11 wherein:
 the commission calculation is programmed to compute different commission amounts for the same bid or offer for different counterparties based on the type of commission agreement pertaining to the respective counterparty.

15. The counterparty customer's workstation of claim 11 wherein:
 the commission calculation is programmed to vary based on the type of financial instrument.

16. The counterparty customer's workstation of claim 11 wherein the commission calculation is programmed to vary based on the bid or offer size.

17. The counterparty customer's workstation of claim 11 wherein the commission calculation is programmed to vary based on the dollar amount of the bid or offer on the interest-rate-related instrument.

18. The counterparty customer's workstation of claim 11 wherein:
 the bid or offer information is received from a central server of the electronic trading system.

19. The counterparty customer's workstation of claim 11 wherein:
 the commission calculation is computed on the central server.

20. The counterparty customer's workstation of claim 11 wherein:
 the counterparty computer is workstation adapted to display bid and offer information on the financial instrument to the counterparty in an interactive view region.

21. The counterparty customer's workstation of claim 11 wherein the commission is calculated for a multi-legged transaction.

22. A method comprising the steps of:
 receiving into memory of a computer of a computer trading system data describing a trading party's bid or offer proposing to trade a financial instrument, and based at least in part on the bid or offer data, computing a commission to trade at least a part of the bid or offer with a counterparty customer;
 tradeably presenting the bid or offer to the counterparty customer, the presentation including the computed commission for the proposed trade, or a price for the proposed trade net of the commission;
 receiving data representing an instruction from an order-modifying customer of the electronic trading system to modify the bid or offer in a manner that influences the commission on the proposed trade; and
 computing an updated commission based on the instruction received from the order-modifying customer modifying the bid or offer, and tradeably presenting electronic data representing the modified bid or offer and the computed updated commission to the counterparty customer, the updating and presenting of the commission electronic data being performed in computers in substantially real time response to the instruction.

23. The method of claim 22 further comprising the step of:
 the instruction from the order-modifying customer is an instruction to modify the type of commission agreement in order to influence the commission.

24. The method of claim 22 wherein:
the electronic trading system is programmed to compute different commission amounts for the same bid or offer calculate different commission amounts for the same bid or offer for different counterparty customers to whom the bid or offer is presented.

25. The method of claim 22 wherein the calculating the commission is further based on the type of customer commission agreement.

26. The method of claim 22 wherein:
the order-modifying customer is the customer that placed the bid or offer.

27. The method of claim 22 wherein:
the order-modifying customer is the counterparty customer to whom the bid or offer is presented.

28. The method of claim 22 wherein:
the instruction from the order-modifying customer is an instruction to modify the size of the trade to be executed on the bid or offer.

29. The method of claim 22, wherein:
the tradeably presenting is presenting from a central server to a computer of the counterparty customer.

30. The method of claim 22, wherein:
the tradeably presenting is presenting on a visible display of a computer of the counterparty customer to the counterparty customer.

31. The method of claim 22, wherein:
the commission is calculated for a multi-legged transaction.

* * * * *